July 19, 1932.  C. P. DANIEL  1,867,551
BUMPER
Filed Jan. 17, 1930  4 Sheets-Sheet 1
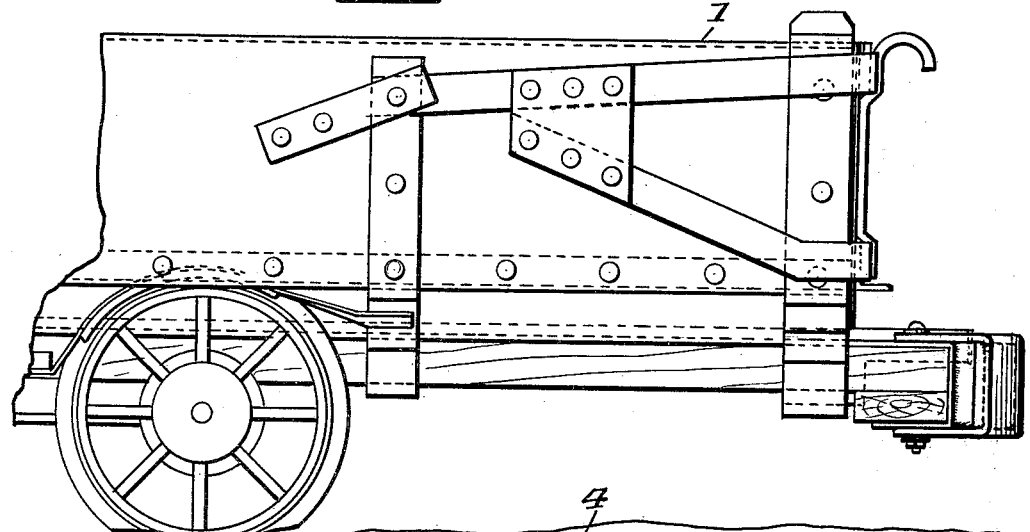
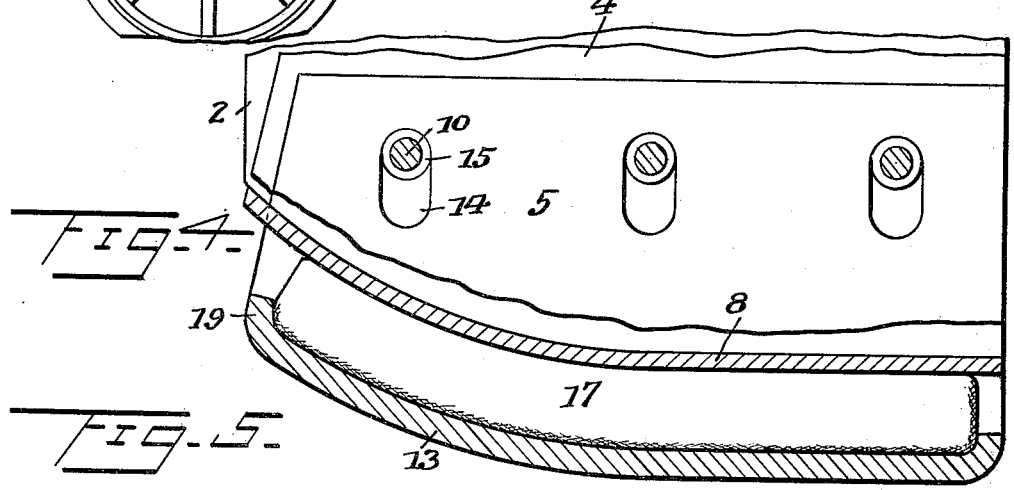
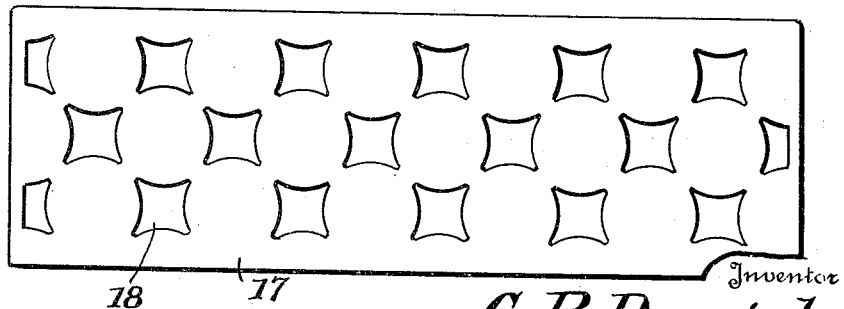
Inventor
C. P. Daniel
By Jacobi & Jacobi
Attorneys July 19, 1932.  C. P. DANIEL  1,867,551
BUMPER
Filed Jan. 17, 1930  4 Sheets-Sheet 2
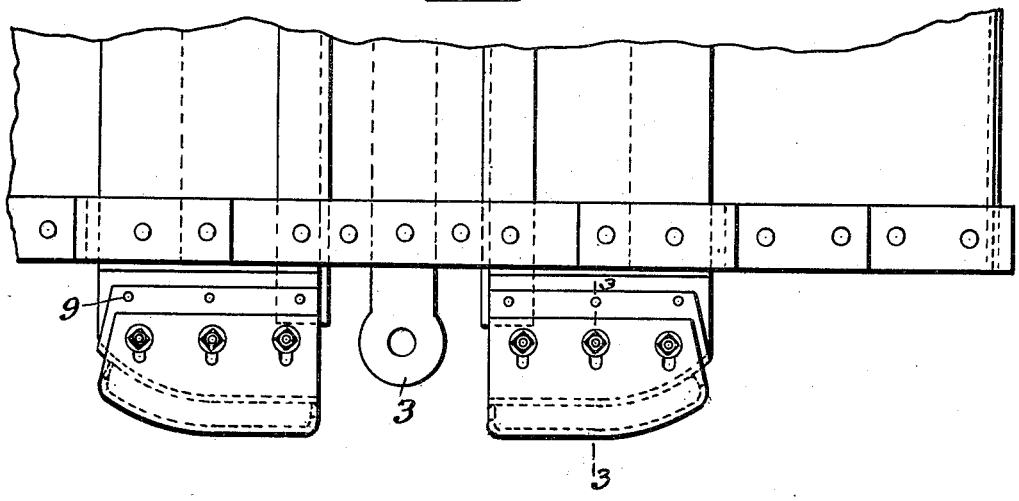
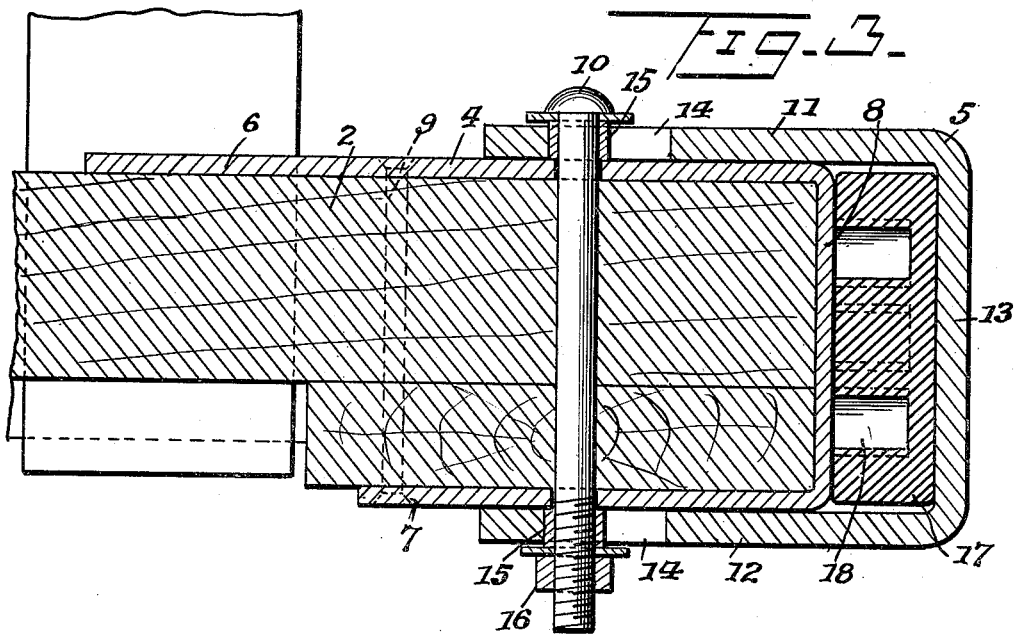
Inventor
C. P. Daniel
By Jacobi & Jacobi
Attorneys July 19, 1932. C. P. DANIEL 1,867,551
BUMPER
Filed Jan. 17, 1930  4 Sheets-Sheet 3

Inventor
C. P. Daniel
By Jacobi & Jacobi
Attorneys

July 19, 1932.  C. P. DANIEL  1,867,551
BUMPER
Filed Jan. 17, 1930    4 Sheets-Sheet 4

Inventor
C. P. Daniel
By Jacobi & Jacobi
Attorneys

Patented July 19, 1932

1,867,551

UNITED STATES PATENT OFFICE

CLARENCE P. DANIEL, OF BRISTOL, VIRGINIA

BUMPER

Application filed January 17, 1930. Serial No. 421,445.

The present invention relates to improvements in bumpers or buffers and has reference more particularly to a resilient bumper construction for association with a railway car end.

One of the important objects of the present invention is to provide a bumper that will at all times be positive and efficient in carrying out the purposes for which it is designed, the same being further of such construction as to be more elastic and more durable than the car end bumpers now generally in use.

A further and important object of the invention is to provide a bumper of the above mentioned character that includes a rubber cushioning pad for taking up the shock incident to the coupling and pushing of railway cars together.

A further object is to provide a bumper which includes a channel shaped impact receiving member constituting a casing for the rubber cushioning pad, said impact receiving member being constructed for sliding movement longitudinally of the car.

A further object is to provide a bumper of the above mentioned character wherein means are employed for retaining the rubber cushioning pad in position within the channel shaped impact receiving member against sliding movement.

A further and salient object of the present invention is to provide a bumper of the above mentioned character which is simple in construction, inexpensive, and which can furthermore be readily and easily attached to a car end without necessitating any material alterations.

Other objects and advantages of the present invention will become apparent from the following description when taken in connection with the accompanying drawings.

In the accompanying drawings wherein like reference characters indicate corresponding parts throughout the several views.

Figure 1 is a fragmentary side elevation of a railway car showing my improved bumper construction attached to the car end.

Figure 2 is a top plan view showing a pair of bumpers secured on the projecting ends that are arranged on opposite sides of the coupling member of a railway car.

Figure 3 is a longitudinal vertical sectional view taken approximately on the line 3—3 of Figure 2.

Figure 4 is a fragmentary top plan view with parts in section for more clearly disclosing the relation of the rubber cushioning pad with respect to the inner and outer channel members.

Figure 5 is an inner face view of the rubber cushioning pad forming a salient part of the present invention.

Figure 6:
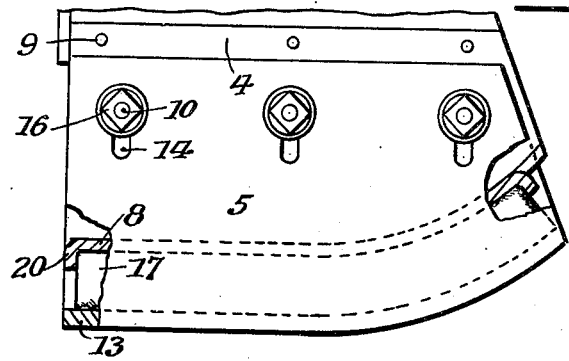
Figure 6 is a fragmentary plan view showing a modification of the retaining means for the rubber cushioning pad.

In the drawings, with reference more particularly to Figures 1 to 5, inclusive, the numeral 1 designates generally a railway mine car of the conventional construction, the same being provided at its end with the spaced horizontally projecting tongues 2 that are arranged at opposite sides of the centrally located coupling element 3 in the manner as is well known in the art.

My improved bumper that is adapted for association with each of the projecting tongues 2 includes the complementary inner and outer channel shaped members 4 and 5, respectively, that are shaped to conform to the configuration of the projecting tongue 2.

As is more clearly illustrated in Figure 3 the inner channel shaped member 4 embraces the outer edge portion of the tongue 2 and the horizontally disposed walls 6 and 7 engage with the upper and lower faces of the projecting tongues while the crown portion 8 embraces or fits against the outer edge of the tongue. This inner channel shaped member 4 is fixedly secured around the tongue by the securing means shown at 9 and also extending through the upper and lower walls 6 and 7 of the inner channel shaped member 4 as well as through the tongue 2 are the spaced bolts 10, the purpose of which will be presently described.

The outer channel shaped member 5 has its upper and lower horizontal walls 11 and 12 respectively slidably engaging with the outer faces of the upper and lower walls 6 and 7 of the inner channel shaped member 4 while the crown portion 13 of the outer channel shaped member 5 is spaced from the crown portion 8 of the inner channel shaped member 4. Furthermore, the crown portion 13 of the outer channel shaped member 5 constitutes an impact receiving face.

The upper and lower horizontal walls of the other channel shaped member 5 are formed with elongated slots shown at 14 to accommodate the respective bolts 10 and suitable bushings 15 encircle the bolts 10 for disposition within the respective slots. Suitable nuts 16 are threaded on the lower ends of the bolts for securing the same in place. These bushings 15, encircling the bolts 10 within the slots 14, enable the tightening of the nuts 16 on said nuts, thereby securing same to the inner channel member 4 and correspondingly to the projection 2 without affecting the slidable relationship between the two channel shaped members 4 and 5. These bushings further serve to protect the bolts from erosion and wear under the sliding action of the channel shaped member 5, as appears obvious.

Forming a salient part of the present invention is the rubber cushioning pad 17 that is adapted to be interposed between the crown portion 8 and 13 of the inner and outer channel shaped members 4 and 5 respectively, in the manner as clearly shown in Figure 3. In Figure 5 of the drawings, I have illustrated in detail the construction of this cushioning pad and it will be observed upon referring to this particular figure that the pad is formed in its inner face with a series of recesses or openings 18, the same being preferably arranged in staggered relation. These recesses form air pockets abutting the front wall of the inner channel shaped member, thereby providing additional resilience and shock absorbing means.

For the purpose of retaining the rubber cushioning member 17 in position between the inner and outer channel shaped members 4 and 5, various means may be employed and attention is now directed to Figure 4 wherein there is disclosed the formation of inwardly directed lugs 19 that are formed at the respective ends of the crown portion 13 of the outer channel shaped member 5 and these lugs engage with the respective ends of the cushioning pad 17.

In Figure 6 of the drawings, a further modification of the retention means for the cushioning pad 17 is disclosed and this particular instance, the respective ends of the crown portion 8 of the inner channel shaped member 4 are directed laterally to provide the lugs 20 that engage with the respective ends of the cushioning pad 17.

Figure 7:
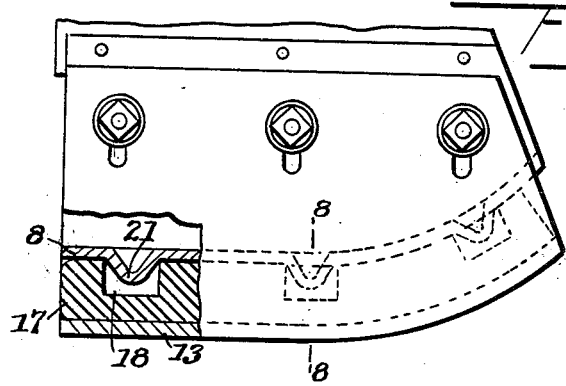
Figure 7 is a view similar to Figure 6 showing a further modification of the rubber pad retention means.
Figure 8:
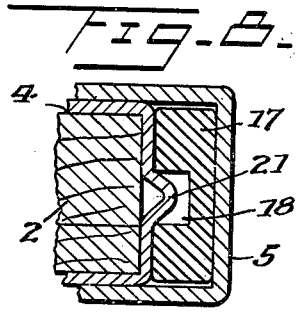
Figure 8 is a vertical sectional view taken approximately on the line 8—8 of Figure 7.

In Figures 7 and 8, a still further modification of the rubber cushioning pad retention means is disclosed wherein the crown portion 8 of the inner channel shaped member 4 is formed with the outwardly projecting protuberances 21, the same being adapted to enter the adjacent openings 18 formed in the inner face of the cushioning member 17.

Figure 9:
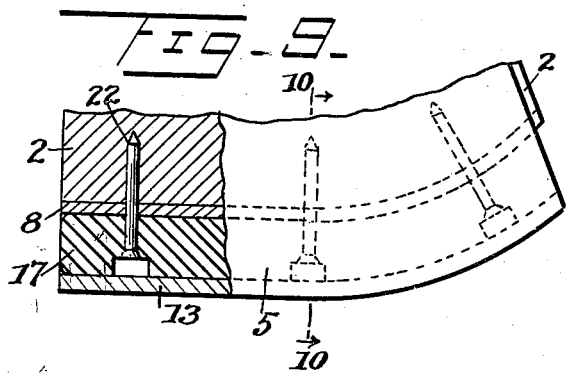
Figure 9 is still a further modification of the retaining means for the rubber cushioning pad.
Figure 10:
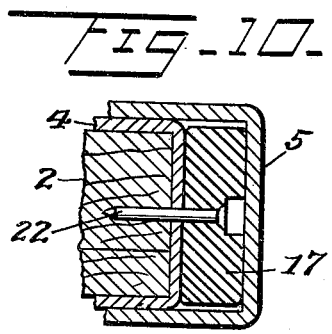
Figure 10 is a sectional view similar to Figure 8 taken approximately on the line 10—10 of Figure 9.

In Figures 9 and 10, a still further modification of the securing means for the rubber cushioning pad is shown and in this instance, said securing means comprising nails or pins 22 that extend through the rubber cushioning pad 17 and through openings provided therefor in the crown portion 8 of the inner channel shaped member 4, the pointed ends of the nails being driven into the wooden tongue.

Figure 11:
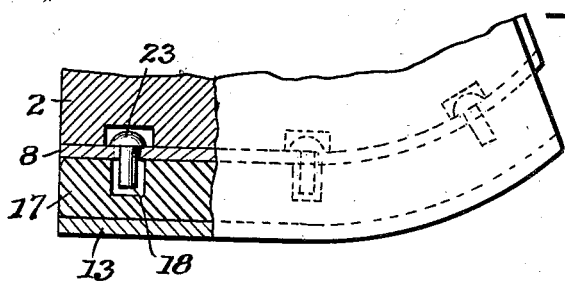
Figure 11 is a view similar to Figure 9 showing still a further modification of the securing means for the rubber cushioning pad.

In Figure 11, a still further modification of the rubber cushioning member retaining means is shown wherein said retaining means comprises a series of rivets 23 that extend through openings in the inner crown portion, the free ends of the rivets extending into the pockets or openings 18 formed in the inner face of the rubber cushioning pad 17. The purpose of the securing means for the rubber cushioning pad is to prevent the lateral sliding movement of said pad between the spaced inner and outer channel shaped members without interfering with the normal resilient action of said pad as is readily obvious from the various modifications shown in the drawings.

Figure 12:
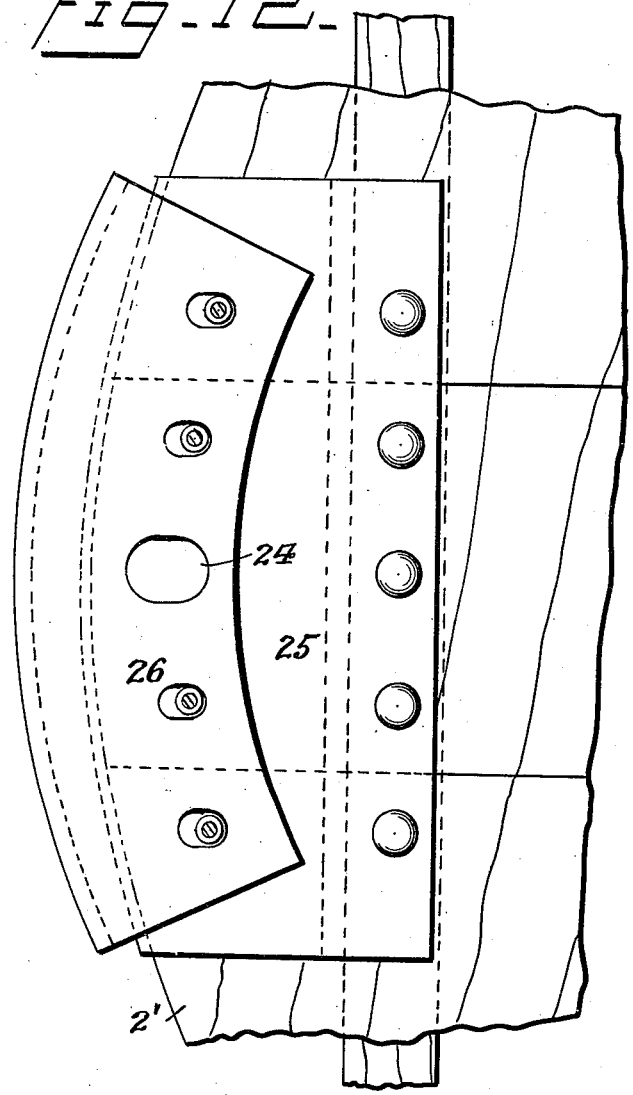
Figure 12 is a view similar to Figure 2 showing a single bumper for association with a car end that does not have its projecting ledge formed of separate portions.
Figure 13:
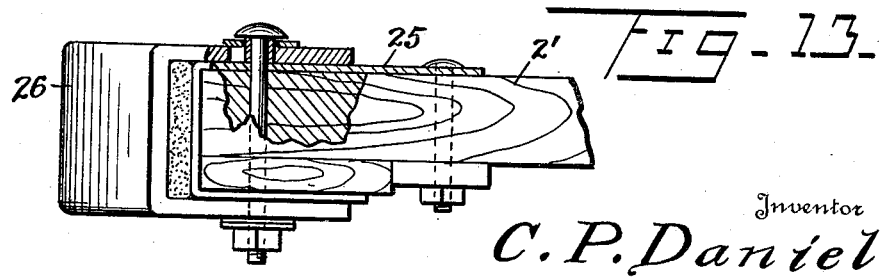
Figure 13 is an end view with parts shown in section of the modification illustrated in Figure 12.

With reference now to Figures 12 and 13 of the drawings, it will be observed that only one bumper is employed and this type of bumper is only used where the projecting tongue is centrally located with respect to the railway car. The bumper is however of substantially the same construction as the type of bumper shown in Figures 1 and 2 and will operate in the same manner, and any appropriate means may be associated with this particular type of bumper for securing the rubber cushioning pad in position between the inner and outer spaced channed shaped member.

It will be further noted that the channel shaped members are formed with centrally located registering openings 24 to accommodate the coupling pin, not shown, when the adjacent ends of two railway cars are coupled together.

It will also be observed that the crown portions of the inner and outer channel shaped members 25 and 26, respectively are of more arcuate shape than the crown portions of the inner and outer channel shaped members 4 and 5.

Normally the rubber cushioning pad will exert an outward pressure on the sliding outer channel shaped member so that the bolts 10 will be disposed in the innermost ends of the slots 14. However, when the cars are coupled together or are being bushed one against the other the impact faces 13 of the bumpers on one car will strike the complementary impact faces of the bumpers on the adjacent car causing a compression of the rubber cushioning pad which results in the inward sliding movement of the outer channel shaped member of each bumper and this action will tend to reduce the shock incident to the coupling or butting of the cars together to a minimum.

The recesses or air pockets 18 are substantially rectangular in cross section, as disclosed in Figure 5 but the walls thereof are concavo-convex. The object of so forming the walls of these recesses is to provide for the expansion of the rubber when pressure occurs thereagainst so that the columns of rubber between the series of recesses being expanded will cause the corners of the openings of the adjacent recesses to be brought in closer proximity one to the other and thus prevent the tearing or severance of rubber which would occur were the walls of the openings not so formed. The illustration shown in Figure 5 is the preferred form but of course, the applicant does not wish to be limited to this particular form of opening or recess.

The simplicity of my improved bumper enables the same to be readily and easily installed on a car and without necessitating any material alterations and said bumper will at all times be positive and efficient in carrying out the purposes for which it is designed. Also a bumper of this construction will be strong and durable as well as inexpensive in its manufacture.

While I have shown the preferred embodiment of the invention, it is to be understood that minor changes in the size, shape and arrangement of parts may be resorted to without departing from the spirit of the invention and the scope of the appended claims.

Having thus described the invention what I claim as new is:

1. In a bumper for car ends, wherein the car end is provided with a projection, an inner channel shaped member secured over the outer edge portion of the projection, an outer channel shaped member, the upper and lower walls thereof being slidably disposed on the adjacent walls of the inner channel shaped member, the crown portion of the outer channel shaped member being spaced with respect to the crown portion of the inner channel shaped member, and a flat elongated rubber cushioning pad interposed and filling the space between the crown portion of said channel shaped members, said pad being formed with air pockets opening through its inner face and the inner member having means engaged in certain of said pockets to prevent shifting of the pad out of position.

2. In a bumper for car ends, wherein the car end is provided with a projection, an inner channel shaped member secured about the outer end portion of said projection, an outer channel shaped member engaged about the inner member and slidable longitudinally thereon with its crown portion spaced outwardly from the crown portion of the inner member, a rubber cushioning pad in the outer member between crown portions of the two members and formed with pockets having open ends facing the crown portion of one member for closure thereby whereby air will be trapped in the pockets when the outer member is shifted inwardly to compress said pad, the crown portion closing said pockets having means engaged in certain of the pockets to prevent shifting of the pad out of position.

3. In a bumper for car ends, wherein the car end is provided with a projection, an inner channel shaped member secured about the outer end portion of said projection, an outer channel shaped member engaged about the inner member and slidable longitudinally thereon with its crown portion spaced outwardly from the crown portion of the inner member, a rubber cushioning pad in the outer member between crown portions of the two members and formed with pockets having open ends facing the crown portion of one member for closure thereby whereby air will be trapped in the pockets when the outer member is shifted inwardly to compress said pad, the crown portion closing said pockets having portions bent to form projections engaged in the open ends of certain of said pockets to prevent shifting of the pad out of position.

4. In a bumper for car ends, wherein the car end is provided with a projection, an inner channel shaped member secured about the outer end portion of said projection, an outer channel shaped member engaged about the inner member and slidable longitudinally thereon with its crown portion spaced outwardly from the crown portion of the inner member, a rubber cushioning pad in the outer member between crown portions of the two members and formed with pockets having open ends facing the crown portion of one member for closure thereby whereby air will be trapped in the pockets when the outer member is shifted inwardly to compress said pad, and pins carried by the last mentioned crown portion and engaged in the open ends of certain of said pockets to prevent shifting of the pad out of position.

In testimony whereof I affix my signature.

CLARENCE P. DANIEL.